H. BAILEY.
Spoke-Socket.
No. 43,544.
Patented July 12, 1864.
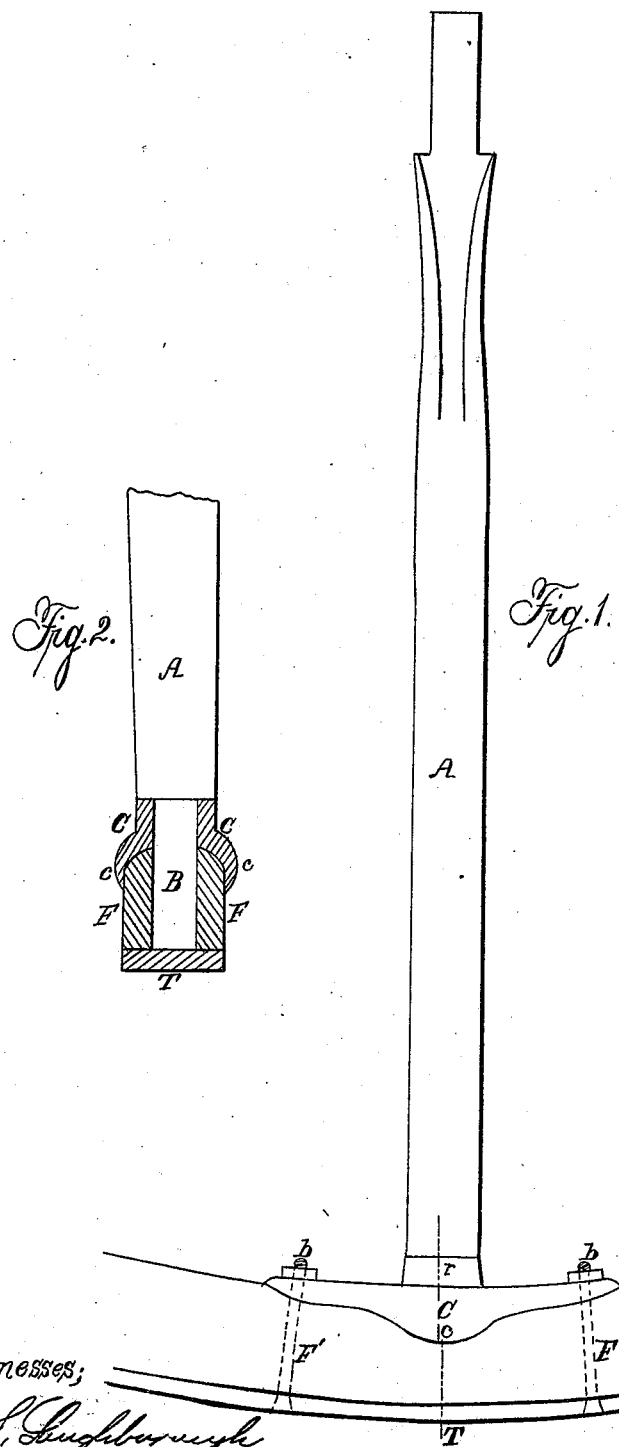

UNITED STATES PATENT OFFICE.

HARRY BAILEY, OF PITTSFORD, NEW YORK, ASSIGNOR TO GEORGE D. BROWN, OF SAME PLACE.

IMPROVEMENT IN JOINT-CLIPS AND SPOKE-SOCKETS FOR WHEEL-VEHICLES.

Specification forming part of Letters Patent No. 43,544, dated July 12, 1864.

*To all whom it may concern:*

Be it known that I, HARRY BAILEY, of Pittsford, in the county of Monroe and State of New York, have invented a new and useful joint-clip and spoke-socket for carriage and other wheels; and I do hereby declare that the following is a full, clear, and exact description thereof, reference being had to the accompanying drawings, making a part of this specification, in which—

Figure 1 is a side elevation of my invention as applied to the wheel. Fig. 2 is a transverse section of the clip C, and showing the end of the felly F and a portion of the spoke A.

Similar letters of reference indicate corresponding parts in both figures.

This invention consists in the employment of a metallic clip for securing the joints of the fellies of carriage and other wheels, and the joints being arranged at the junction of the spokes, instead of between them, as usually practiced. The said clip is made to act as a socket to receive the tenon of the spoke.

To enable other to work my invention, I will describe its construction and arrangement.

A in the drawings represents a spoke; F and F', the felly; T, the tire; C, the joint-clips and b the clamping-bolts. The clip C may be made of malleable iron, or other suitable metal, and provided with a central lip, c, on each side, to clasp the joint of the fellies. It may also be provided with a projecting collar or rim, r, for the shoulder of the spoke to rest upon, and by removing the joint from the angle of the rim and the body of the clip water is much less likely to find its way to the tenon and cause it to rot. I use ordinary tire-bolts, b, for securing the clips. The felly is bored in the joint to receive the spoke-tenon B, which answers as a dowel to steady the ends of the fellies while they are being dressed off and finished; or, if desired, there may be a small dowel used, in the usual way, and the tenon B cut so as to just reach the felly, when the shoulder strikes the collar r; or the joint-spokes may be omitted until after the fellies are fitted and finished off, when they may be removed, and those spokes "driven," and the fellies replaced with the clips.

Various devices have been suggested to prevent the joints of the fellies, (when arranged between the spokes,) from straightening or setting inward, but they have all proved impracticable. The joints have also been placed at the spokes, but the attachments were so defective that even that plan was also objectionable.

This invention seems to meet every objection satisfactorily, and is an efficient support for the rims of either light or heavy wheels, and the lips c effectually prevent the ends F and F' from splitting, which is by no means as likely to occur when the end of the tenon B rests upon the tire and its shoulder upon the collar, r, as seen in Fig. 2.

What I claim as my invention, and desire to secure by Letters Patent of the United States, is—

The combined joint clip and spoke-socket, when the cylindrical tenon B of the spoke is made to reach through the felly, and the shoulder to rest upon the edge of the projecting collar or socket r, all being constructed and arranged in the manner and for the purposes set forth.

HARRY BAILEY.

Witnesses:
WM. S. LOUGHBOROUGH,
I. L. REQUA.